US00RE46249E

(19) United States
(12) Reissued Patent
LaRocque

(10) Patent Number: US RE46,249 E
(45) Date of Reissued Patent: Dec. 27, 2016

(54) PROTECTIVE HELMET

(71) Applicant: Joey LaRocque, Agoura Hills, CA (US)

(72) Inventor: Joey LaRocque, Agoura Hills, CA (US)

(21) Appl. No.: 29/516,326

(22) Filed: Jan. 30, 2015

Related U.S. Patent Documents

Reissue of:

(64) Patent No.: Des. 708,395
Issued: Jul. 1, 2014
Appl. No.: 29/465,112
Filed: Aug. 23, 2013

(51) LOC (10) Cl. ..... 09-03

(52) U.S. Cl.
USPC ..... D29/106

(58) Field of Classification Search
USPC ..... D29/102–110, 122; D2/866, 870–871, D2/875–879, 882, 886, 891; 2/6.1, 6.2, 2/6.6, 6.7, 9, 172–173, 175.6, 203, 205, 2/206, 410–411, 421–425; 348/151
(Continued)

(56) References Cited

U.S. PATENT DOCUMENTS 1,434,607 A 11/1922 Gilson
1,841,232 A 1/1932 Wells
(Continued)

FOREIGN PATENT DOCUMENTS

EP 0930832 7/1999
WO 9708967 3/1999

OTHER PUBLICATIONS www.amazon.com/Best-Sellers-Sports-Outdoors-Rugby-Headguards/zgbs/sporting-goods/3416031#1 (Amazon Best Sellers_best Rugby Headguards-1).
(Continued)

*Primary Examiner* — Celia Murphy
(74) *Attorney, Agent, or Firm* — McAndrews, Held & Malloy, Ltd.

(57) CLAIM

I claim the ornamental design for a protective helmet, as shown and described.

DESCRIPTION

Figure 2:
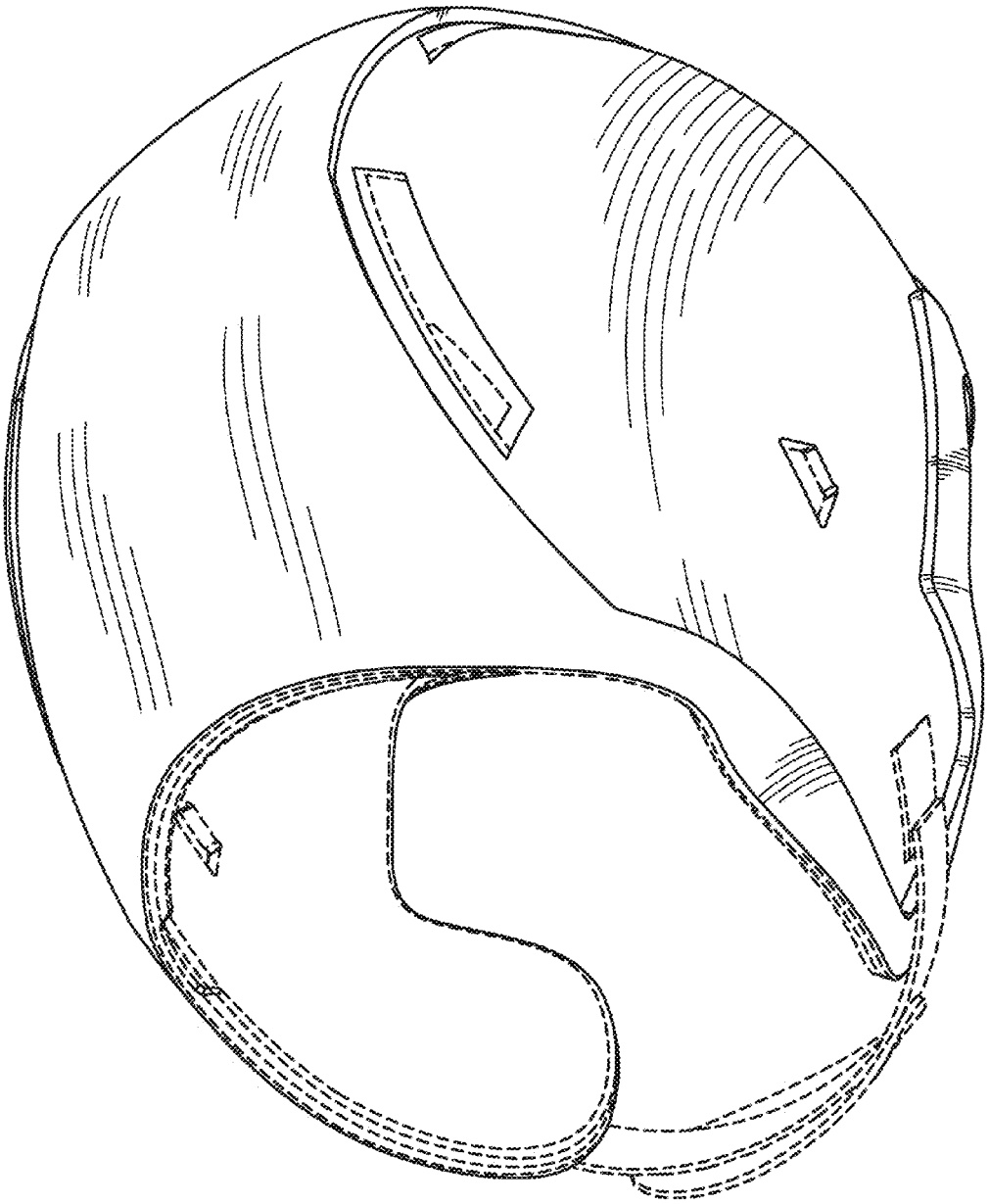
Figure 3:
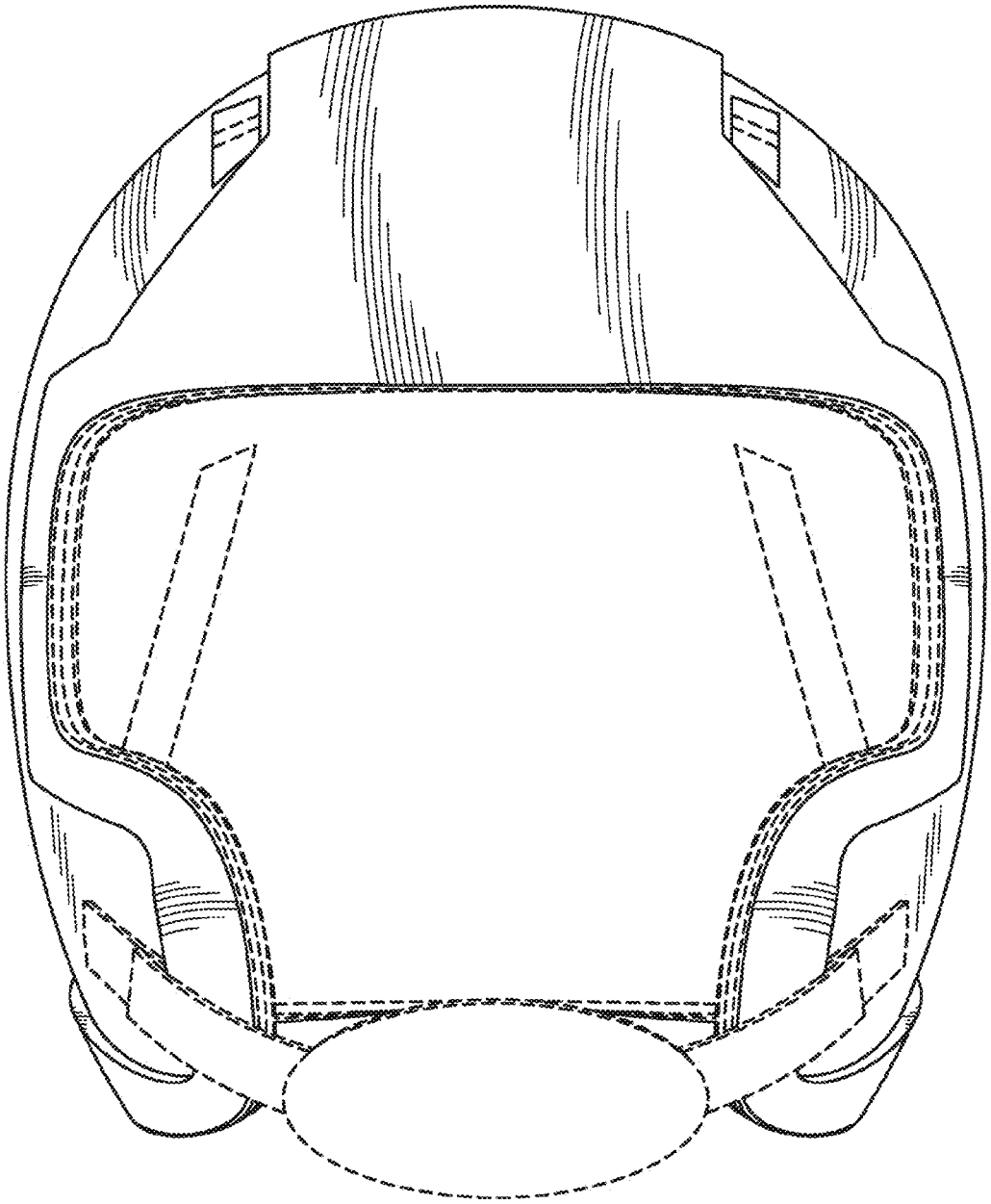
Figure 5:
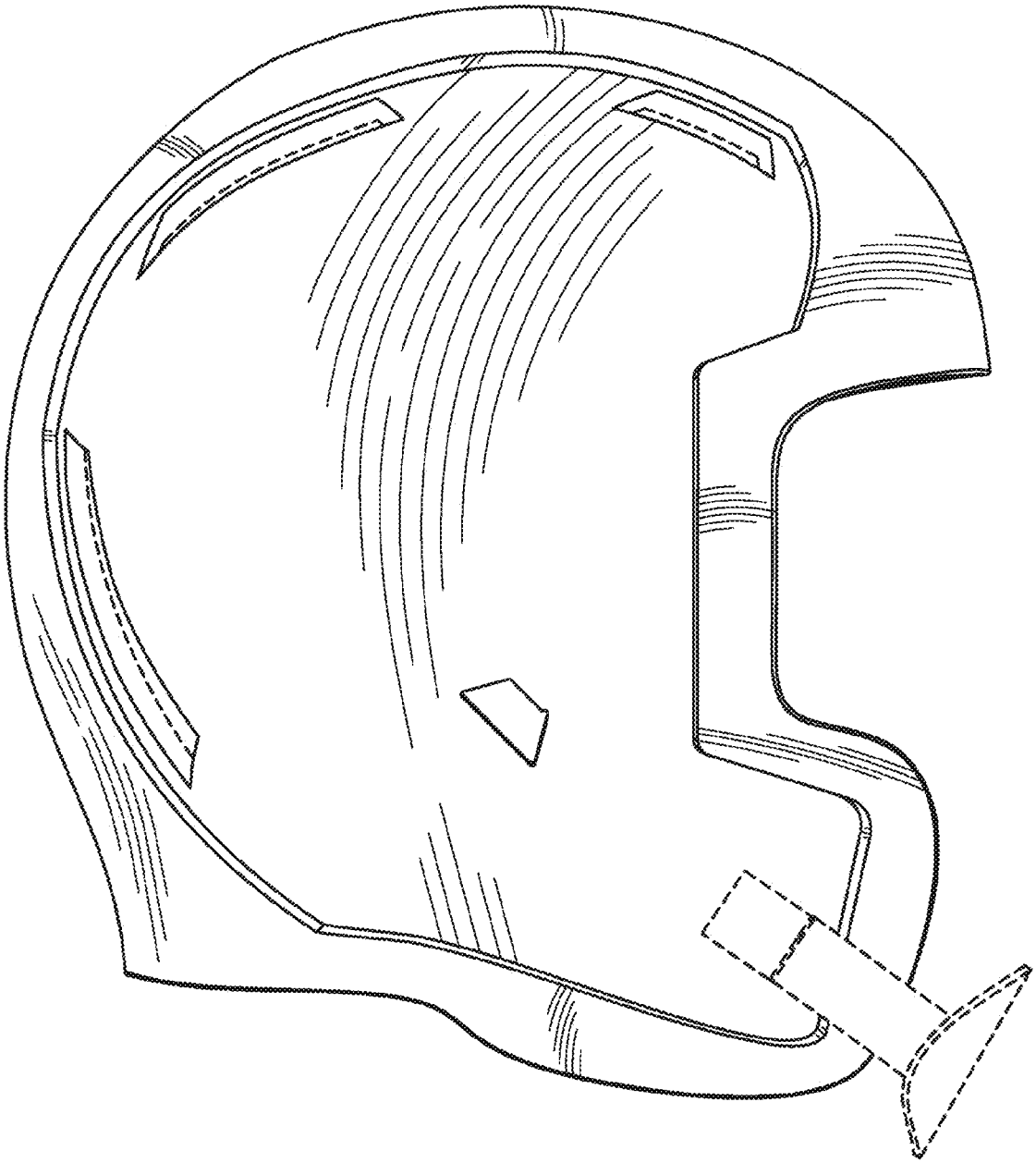
Figure 6:
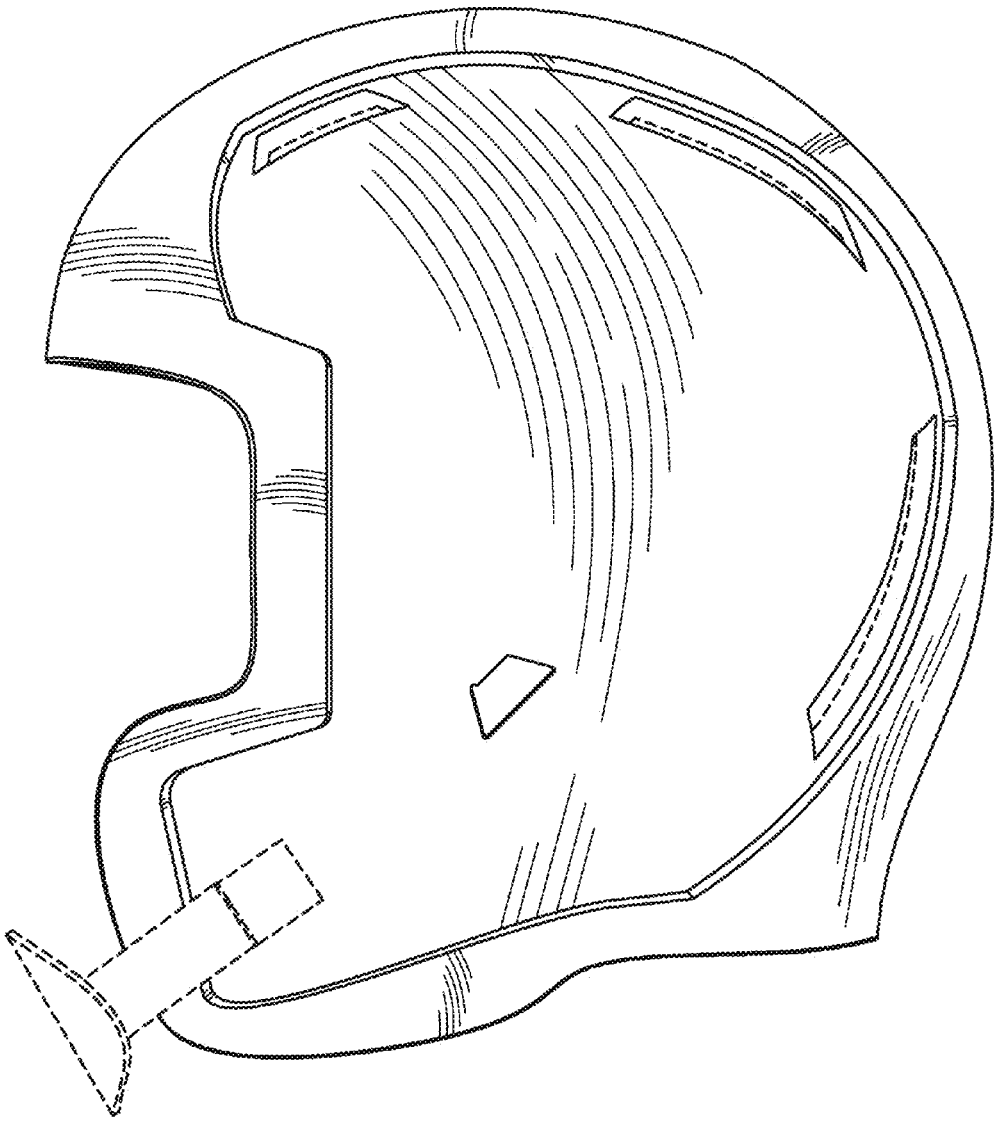
Figure 7:
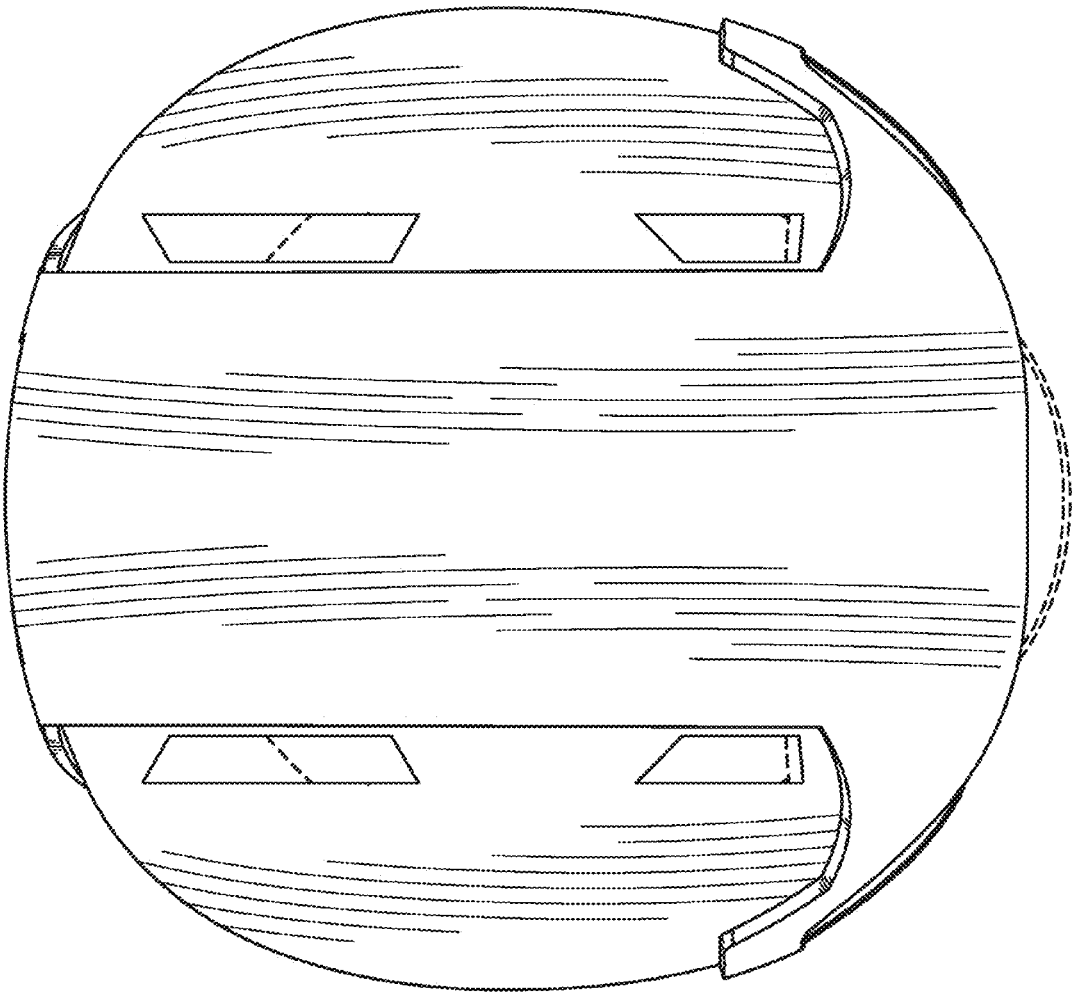
Figure 8:
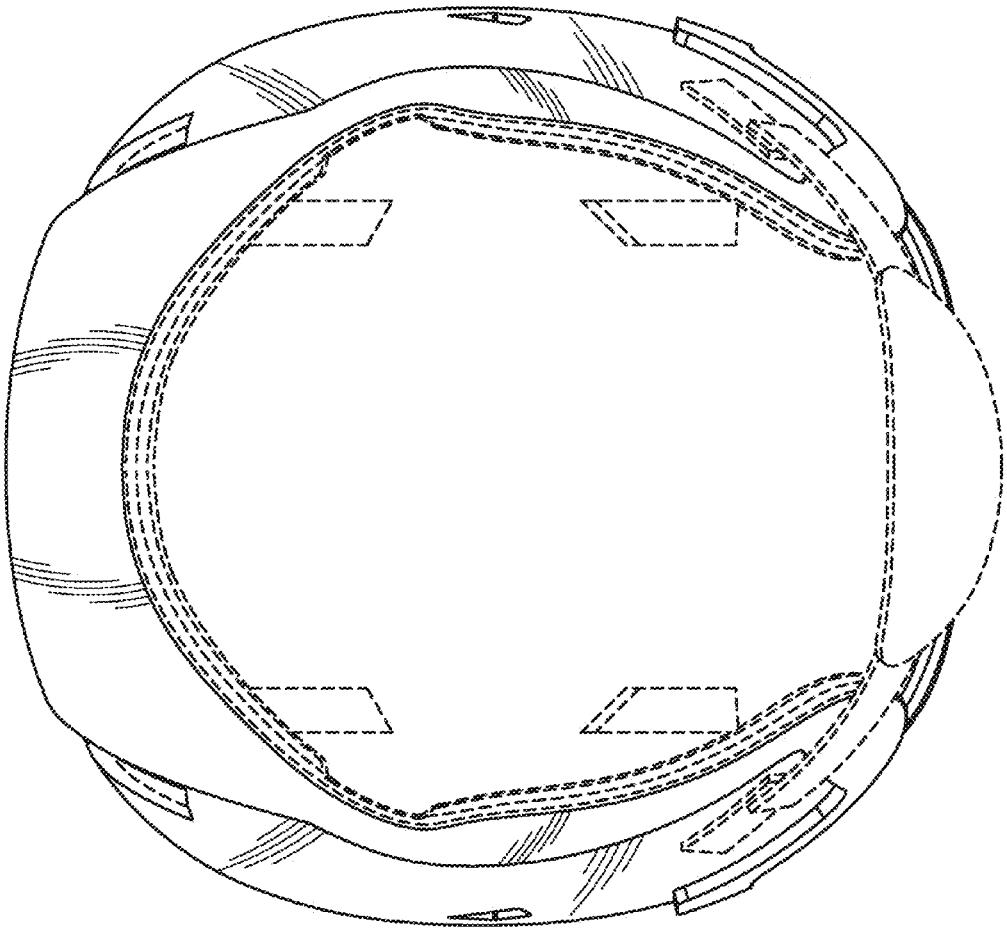

FIG. 1[.] is [an upper] *a top* perspective view of [the] *a first embodiment of a protective* helmet *showing my new design*;
FIG. 2[.] is a [lower] *bottom* perspective view thereof*;*
FIG. 3[.] is a front *elevation* view thereof;
FIG. 4[.] is a rear *elevation* view thereof;
FIG. 5[.] is a [right] *left* side *elevation* view thereof;
FIG. 6[.] is a [left] *right* side *elevation* view thereof;
FIG. 7[.] is a top *plan* view thereof; [and,]
FIG. 8 is a bottom *plan* view thereof[.]*;*
*FIG. 9 is a top perspective view of a second embodiment of a protective helmet showing my new design;*
*FIG. 10 is a bottom perspective view thereof;*
*FIG. 11 is a front elevation view thereof;*
*FIG. 12 is a rear elevation view thereof;*
*FIG. 13 is a left side elevation view thereof;*
*FIG. 14 is a right side elevation view thereof;*
*FIG. 15 is a top plan view thereof; and,*
*FIG. 16 is a bottom plan view thereof.*
*The broken lines shown in the drawings illustrate portions of the protective helmet that form no part of the claimed design.*

1 Claim, 16 Drawing Sheets

Matter enclosed in heavy brackets [ ] appears in the original patent but forms no part of this reissue; matter printed in italics indicates the additions made by reissue.

(AMENDED)

(58) Field of Classification Search
CPC ..... A42B 3/00; A42B 3/04; A42B 3/125; A63B 71/10
See application file for complete search history.

(56) References Cited

U.S. PATENT DOCUMENTS

D100,814 S 8/1936 Fisken
2,140,716 A 12/1938 Pryale
2,372,715 A 4/1945 Ernst
2,546,117 A 3/1951 Whelan
2,594,478 A 4/1952 Moore
2,664,567 A 1/1954 Nichols
2,777,127 A 1/1957 Marietta
D181,686 S 12/1957 Stuart
3,105,240 A 10/1963 Jansson
3,197,784 A 8/1965 Carlisle
3,323,134 A 6/1967 Swyers
D213,085 S 1/1969 Wyckoff
3,435,460 A 4/1969 Grant
3,551,911 A 1/1971 Holden
D220,376 S 4/1971 Brown
3,720,955 A 3/1973 Rawlings
3,761,959 A 10/1973 Dunning
D230,911 S 3/1974 Ispas
3,818,508 A 6/1974 Lammers
3,820,163 A 6/1974 Rappleyea
3,934,271 A 1/1976 Rhee
3,935,044 A 1/1976 Daly
3,978,527 A 9/1976 Bednar
D243,484 S 3/1977 Rhee
4,095,294 A 6/1978 Winterbottom
4,134,156 A 1/1979 Gyory
D253,976 S 1/1980 Davidson
D255,394 S 6/1980 McNabb
4,222,122 A 9/1980 Toms
4,279,038 A 7/1981 Bruckner
D295,800 S 5/1988 Shelton
4,754,501 A 7/1988 Yahn
D298,179 S 10/1988 Strong
D299,180 S 1/1989 Gentes
4,808,469 A 2/1989 Hiles
4,843,642 A 7/1989 Brower
4,845,786 A 7/1989 Chiarella
5,012,533 A 5/1991 Raffler
D318,747 S 7/1991 Barker
5,035,009 A 7/1991 Wingo
D330,271 S 10/1992 Samples
5,177,815 A 1/1993 Andujar
5,271,103 A 12/1993 Darnell
5,324,460 A 6/1994 Briggs
D352,333 S 11/1994 Lieberman
5,361,410 A 11/1994 Sigl
5,361,420 A 11/1994 Dobbs
D355,508 S 2/1995 Tutton
D363,571 S 10/1995 Klose
D366,347 S 1/1996 Avey
D366,557 S 1/1996 Ashby
5,515,546 A 5/1996 Shifrin
5,537,687 A 7/1996 Garza
D378,236 S * 2/1997 Zanotto et al. ..... D29/106
D378,624 S * 3/1997 Chartrand ..... D29/106
D382,370 S 8/1997 Comstock
D382,671 S 8/1997 Shewchenko
D387,502 S 12/1997 Comstock
5,713,082 A 2/1998 Bassette
D401,018 S 11/1998 Chartrand
D412,376 S 7/1999 Jurga
D412,766 S 8/1999 Tang
5,930,841 A 8/1999 Lampe
D415,593 S 10/1999 Tang
6,073,271 A 6/2000 Alexander
6,088,840 A 7/2000 Im
D429,035 S 8/2000 Purnell
6,159,324 A 12/2000 Watters
D443,405 S 6/2001 Quiroz
D444,269 S 6/2001 Jeffreys
D445,962 S 7/2001 Brignone
6,266,827 B1 7/2001 Lampe
D448,890 S 10/2001 Brignone
D449,411 S 10/2001 Largeot
6,298,497 B1 * 10/2001 Chartrand ..... 2/414
D453,056 S 1/2002 Garneau
D453,399 S 2/2002 Racine ..... D29/106
6,360,376 B1 * 3/2002 Carrington ..... 2/412
6,389,607 B1 5/2002 Wood
D459,032 S 6/2002 Gatellet
D459,554 S 6/2002 Gatellet
D459,555 S 6/2002 Gatellet
D460,584 S 7/2002 Green
6,421,840 B1 7/2002 Chen
D461,152 S 8/2002 Schmitt
D465,067 S * 10/2002 Ide et al. ..... D29/106
D466,651 S * 12/2002 Halstead et al. ..... D29/106
D479,020 S 8/2003 Heinrich
6,625,820 B1 9/2003 Lampe
D482,163 S 11/2003 Brown
D490,572 S 5/2004 Finquel
D495,093 S 8/2004 Tintera
D498,334 S 11/2004 Durocher
D500,894 S 1/2005 Coutant
6,934,971 B2 8/2005 Ide
D511,026 S 10/2005 Ide
D512,534 S * 12/2005 Maddux et al. ..... D29/106
D528,705 S 9/2006 Ide
D529,233 S 9/2006 Schneider
D541,480 S 4/2007 Turner
D545,501 S 6/2007 Green
D556,951 S * 12/2007 Gath ..... D29/122
D567,455 S 4/2008 Rogers
D581,599 S 11/2008 Ferrara ..... D29/106
D582,607 S 12/2008 Ferrara
D583,507 S 12/2008 Stingone
D587,407 S 2/2009 Nimmons
D587,852 S * 3/2009 Nimmons ..... D29/106
D587,853 S * 3/2009 Nimmons ..... D29/106
D587,854 S 3/2009 Nimmons
D587,855 S 3/2009 Nimmons
D592,809 S 5/2009 Broersma
D603,099 S * 10/2009 Bologna et al. ..... D29/106
D603,100 S 10/2009 Bologna
D625,050 S * 10/2010 Chen ..... D29/106
D628,121 S 11/2010 Reilly
D628,347 S 11/2010 Chen
D629,162 S 12/2010 Daniel
D634,896 S 3/2011 Weber
D636,536 S 4/2011 Lee
D636,941 S * 4/2011 Pye ..... D29/102
D645,210 S 9/2011 Chilson
8,015,624 B2 9/2011 Baldackin
D651,355 S 12/2011 Schwabe
D654,629 S 2/2012 Chou
D654,630 S * 2/2012 Chou et al. ..... D29/106
D654,632 S 2/2012 Chou
D660,519 S * 5/2012 Laloy ..... D29/102
D665,132 S 8/2012 Shook
D665,154 S 8/2012 Richards
D666,775 S 9/2012 Junker
D669,225 S 10/2012 Woxing
D670,447 S 11/2012 Emrich
D671,687 S 11/2012 Winningham
D677,006 S 2/2013 Pfanner ..... D29/102
D678,617 S * 3/2013 Erb et al. ..... D29/106
D679,867 S 4/2013 Jones
D680,275 S 4/2013 Janetos
D681,280 S 4/2013 Bologna
D681,281 S * 4/2013 Bologna et al. ..... D29/106
8,499,366 B2 * 8/2013 Nimmons et al. ..... 2/425
D696,465 S * 12/2013 Hwang ..... D29/107
D697,267 S * 1/2014 Benvegnu' ..... D29/102
D697,270 S * 1/2014 Simpson ..... D29/106
8,640,267 B1 * 2/2014 Cohen ..... 2/411
D701,348 S * 3/2014 Thurgood et al. ..... D29/102
D701,999 S * 4/2014 Hanson et al. ..... D29/106
D708,395 S * 7/2014 LaRocque ..... D29/106

(56) References Cited

U.S. PATENT DOCUMENTS

| | | | | |
|---|---|---|---|---|
| 8,776,272 | B1 * | 7/2014 | Straus et al. | 2/411 |
| 2009/0106882 | A1 * | 4/2009 | Nimmons et al. | 2/414 |
| 2012/0297525 | A1 | 11/2012 | Bain | |
| 2013/0014313 | A1 | 1/2013 | Erb | |
| 2013/0042396 | A1 | 2/2013 | Wehtje | |
| 2014/0123371 | A1 * | 5/2014 | Witcher | 2/413 |
| 2014/0189937 | A1 * | 7/2014 | Pietrzak et al. | 2/411 |
| 2014/0298571 | A1 * | 10/2014 | Dagan | 2/411 |
| 2015/0000015 | A1 * | 1/2015 | Beauchamp et al. | 2/418 |
| 2015/0040296 | A1 * | 2/2015 | Hanson et al. | 2/411 |

OTHER PUBLICATIONS www.amazon.com/Best-Sellers-Sports-Outdoors-Rugby-Headguards/zgbs/sporting-goods/3416031#3 (Amazon Best Sellers_best Rugby Headguards-3).
www.amazon.com/Best-Sellers-Sports-Outdoors-Rugby-Headguards/zgbs/sporting-goods/3416031#4 (Amazon Best Sellers_best Rugby Headguards-4).

* cited by examiner

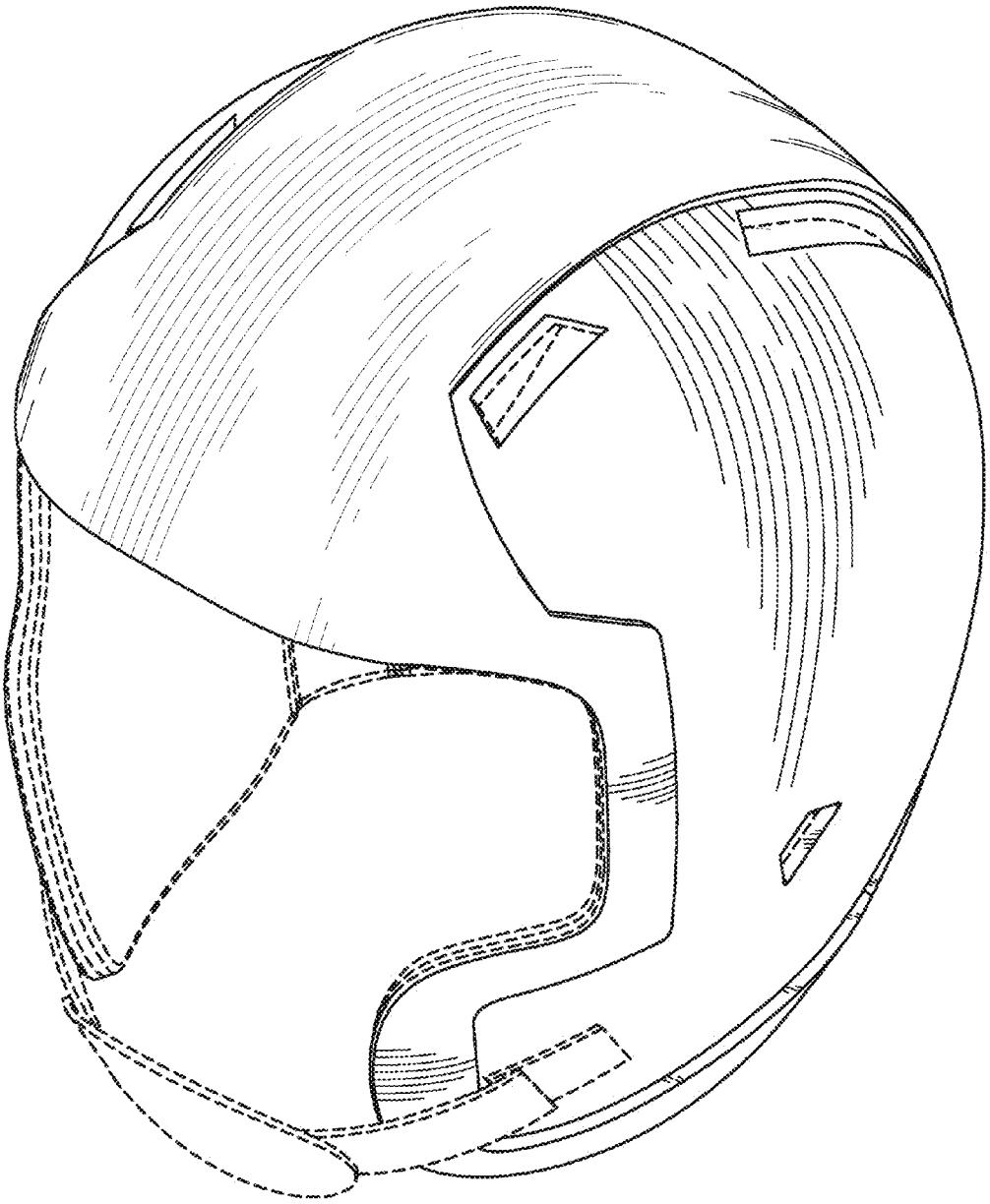
FIG. 1
(AMENDED)

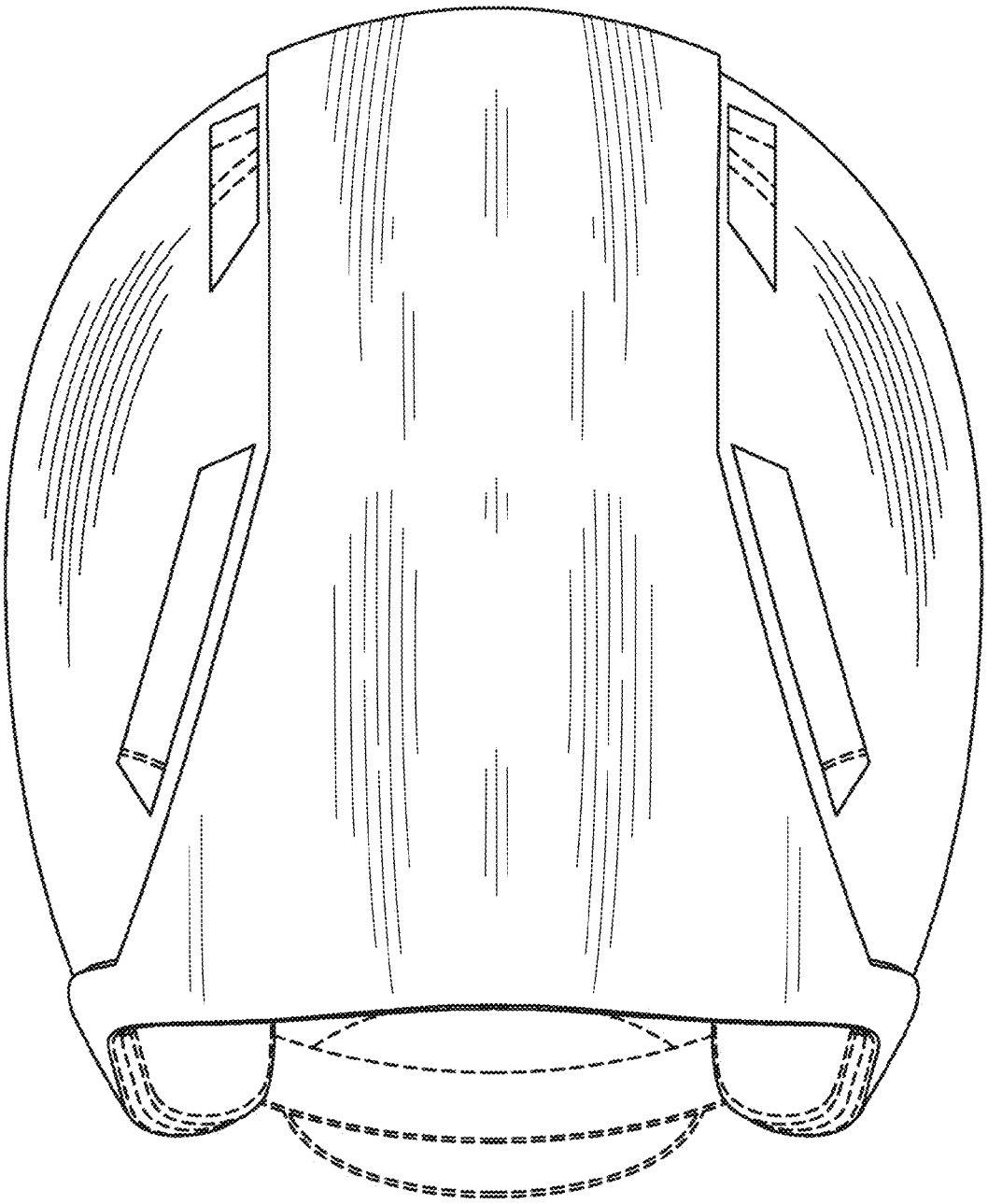
FIG. 4
(AMENDED)

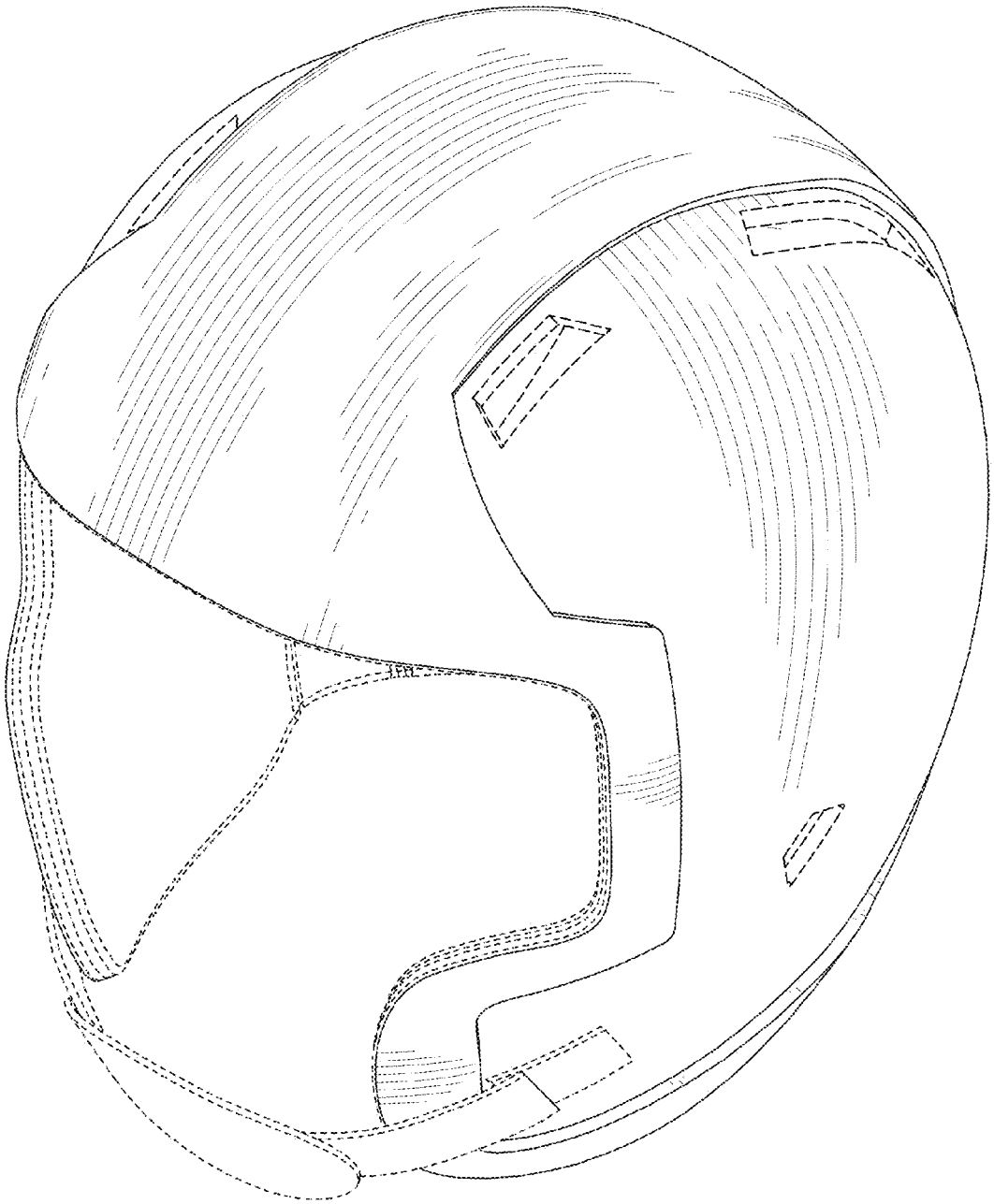
FIG. 9
(NEW)

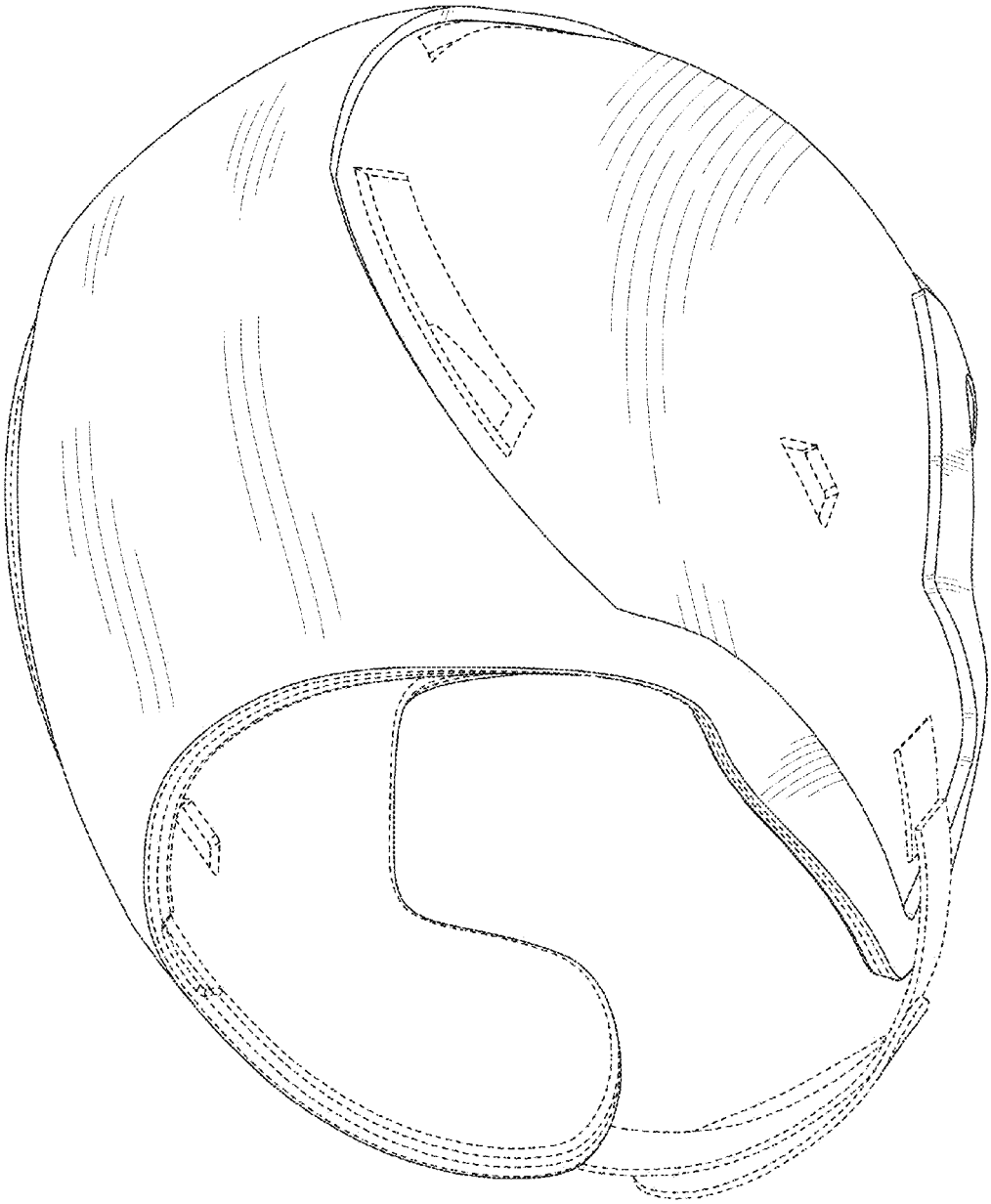
FIG. 10
(NEW)

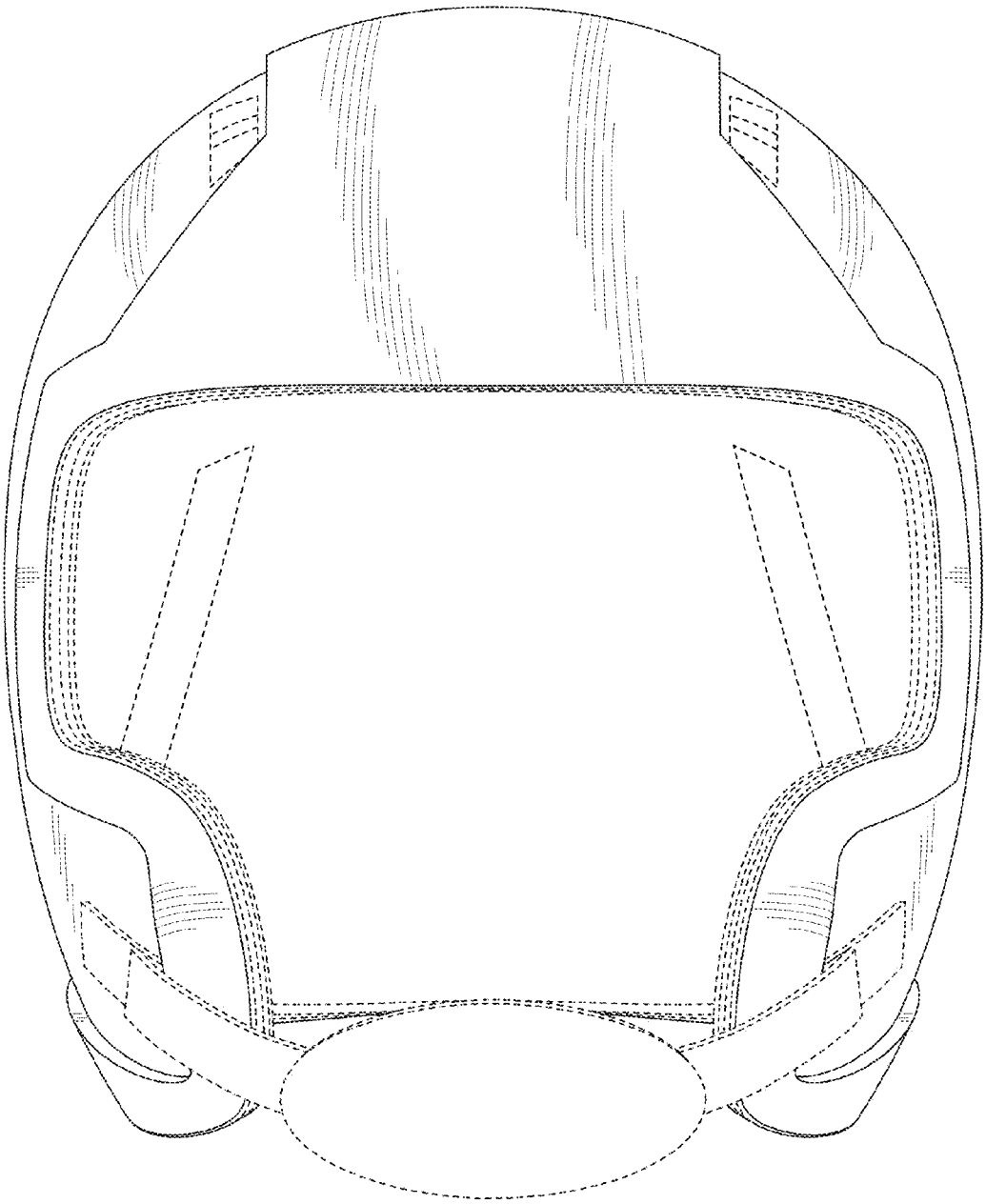
FIG. 11
(NEW)

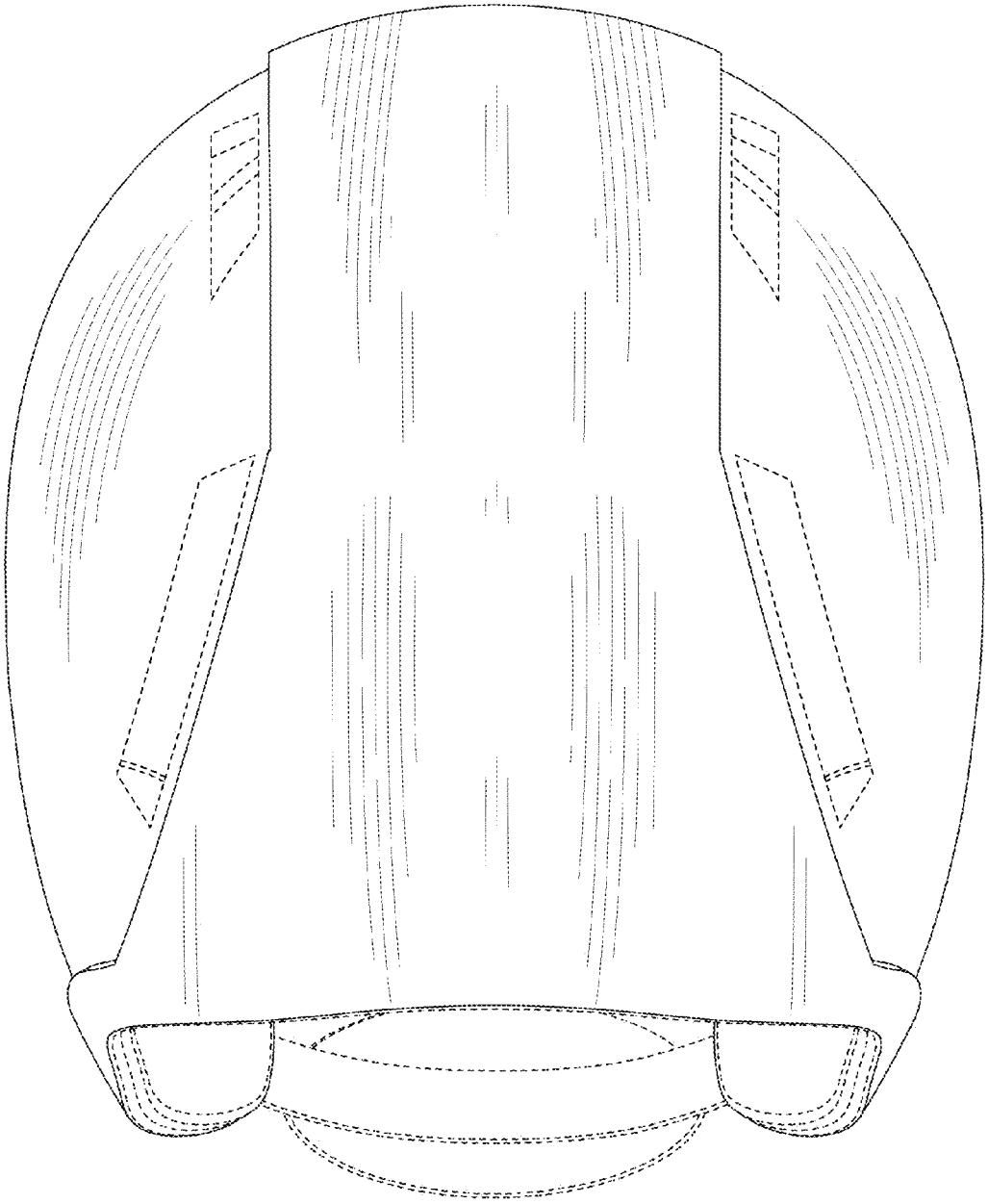
FIG. 12
(NEW)

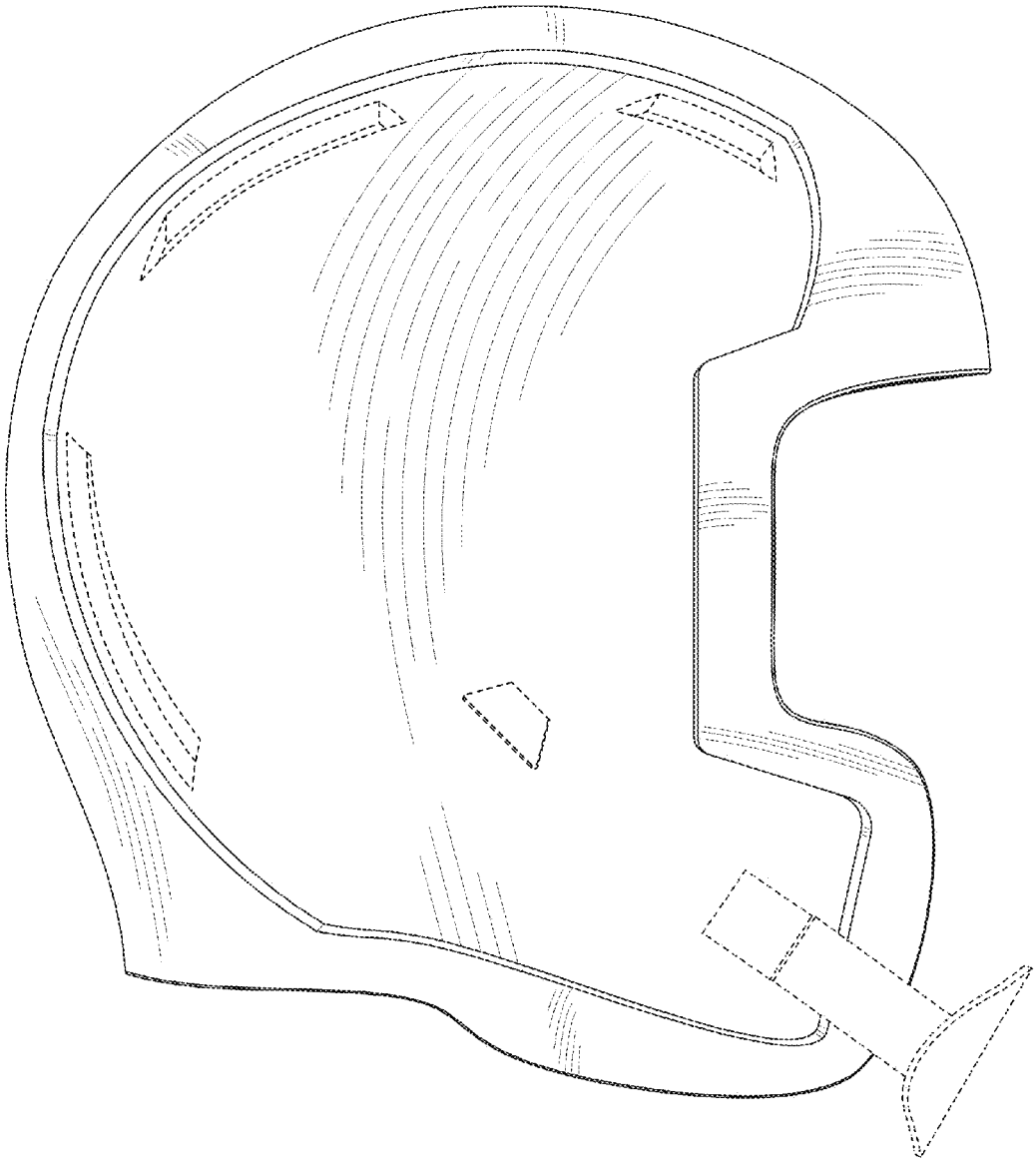
FIG. 13
(NEW)

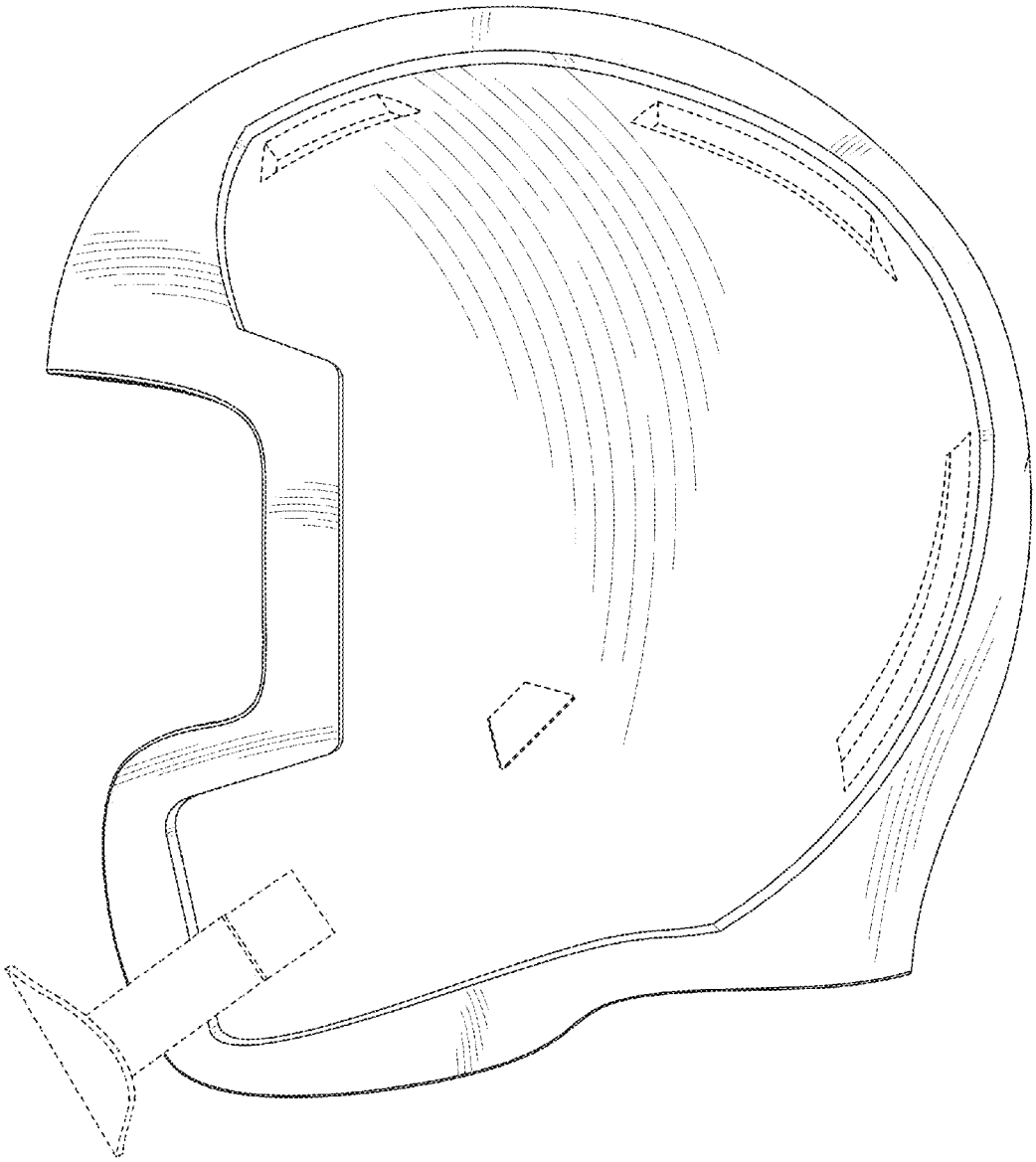
FIG. 14
(NEW)

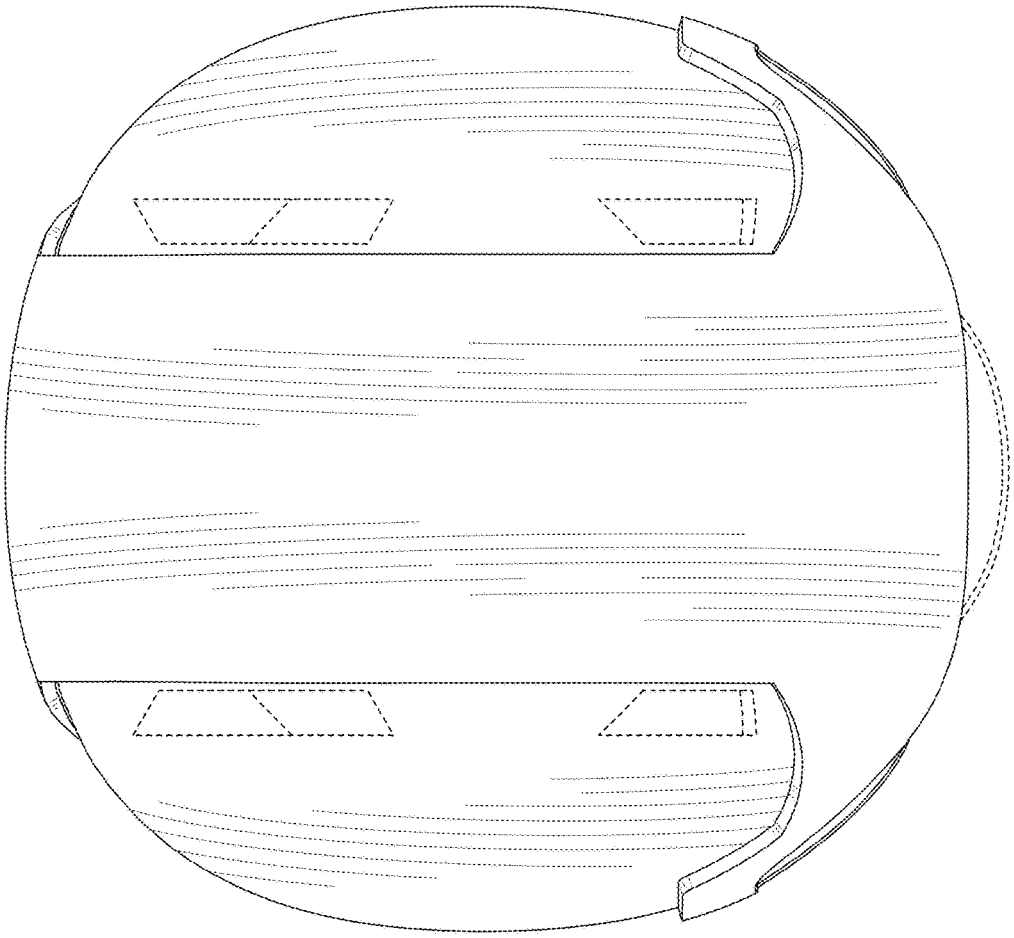
FIG. 15
(NEW)

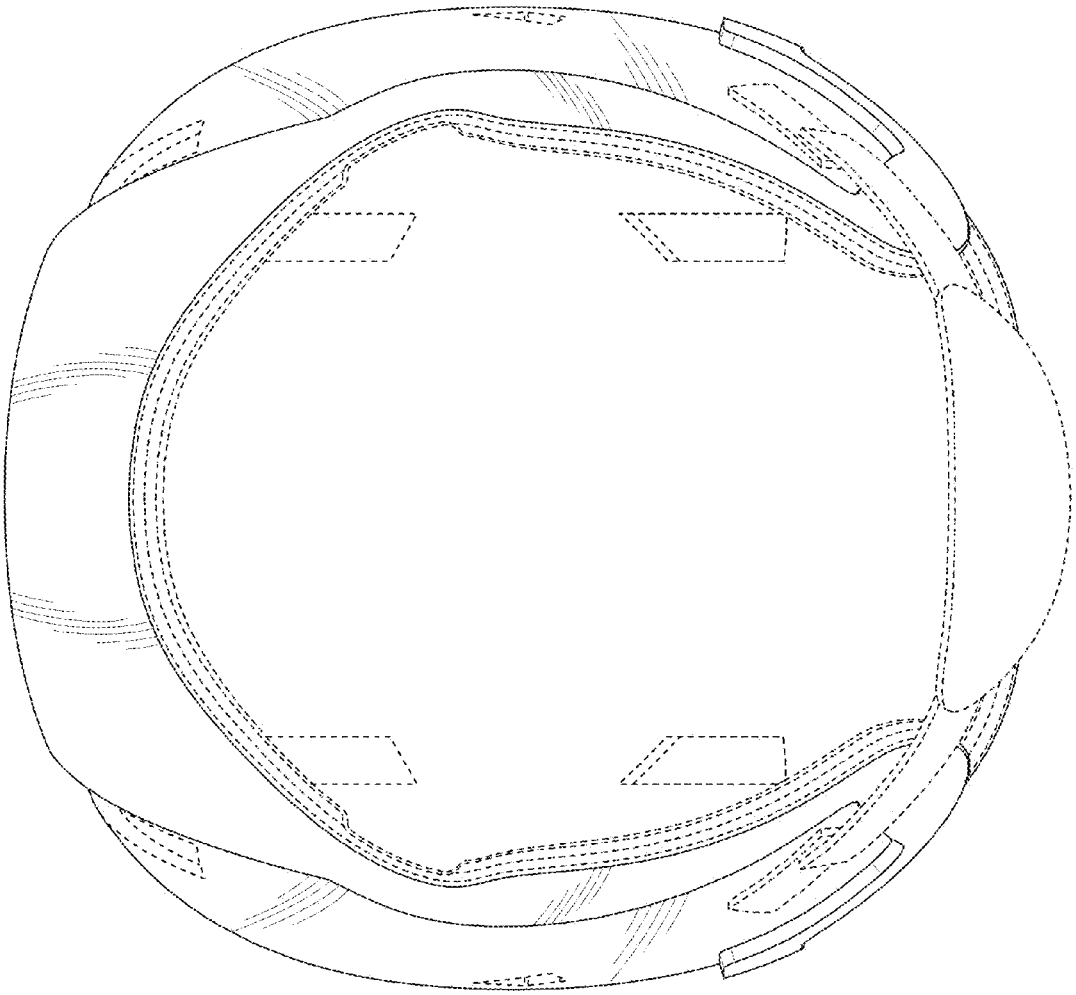
FIG. 16
(NEW)